United States Patent [19]

Tebbe

[11] 4,341,743
[45] Jul. 27, 1982

[54] SIMULTANEOUS OXIDATION AND EXTRACTION OF VANADIUM FROM WET-PROCESS PHOSPHORIC ACID

[75] Inventor: Frederick N. Tebbe, Hockessin, Del.

[73] Assignee: E. I. Du Pont de Nemours and Company, Wilmington, Del.

[21] Appl. No.: 220,822

[22] Filed: Dec. 29, 1980

[51] Int. Cl.$^3$ ............................................. C01G 31/00
[52] U.S. Cl. ...................................... 423/63; 423/10; 423/321 S
[58] Field of Search ................. 423/62, 63, 64, 321 S; 75/101 BE

[56] References Cited

U.S. PATENT DOCUMENTS

| | | | |
|---|---|---|---|
| 2,211,119 | 8/1940 | Hixson | 423/63 |
| 2,756,123 | 7/1956 | Bailes et al. | 23/14.5 |
| 3,449,074 | 6/1969 | Schertzer | 23/165 |
| 3,711,591 | 1/1973 | Hurst et al. | 423/10 |
| 3,734,696 | 5/1973 | Lucid et al. | 423/63 |
| 3,835,214 | 9/1974 | Hurst et al. | 423/18 |
| 4,212,849 | 7/1980 | Lucid et al. | 423/63 |

*Primary Examiner*—Herbert T. Carter

[57] ABSTRACT

The oxidation and extraction steps in the vanadium stripping process (e.g., the DEPA-TOPO or DOPPA-TOPO process) are carried out simultaneously for recovering vanadium from wet-process phosphoric acid.

2 Claims, No Drawings

SIMULTANEOUS OXIDATION AND EXTRACTION OF VANADIUM FROM WET-PROCESS PHOSPHORIC ACID

BACKGROUND OF THE INVENTION

1. Field of the Invention

The present invention relates to a process for the recovery of vanadium from wet-process phosphoric acid and more particularly to a simultaneous oxidation-extraction step in the initial stages of the DEPA-TOPO and DOPPA-TOPO processes for such recovery.

2. Prior Art

In the mining of phosphate rock to recover phosphate-containing fertilizer, the first step consists of digesting the rock with sulfuric acid to produce a phosphoric acid solution and calcium sulfate. The crude phosphoric acid solution, called "wet-process" phosphoric acid, can be processed to remove vanadium and uranium values, particularly if it can be economically justified. Recovery of vanadium and uranium from crude phosphoric acid not only provides an additional valuable mineral source, but also removes unwanted contaminants from the phosphoric acid, much of which is used to make fertilizer. It is important, however, that chemicals used in vanadium and uranium removal do not add any substantial contaminant burden to the phosphoric acid.

There are two types of processes which can be used to extract vanadium and/or uranium values from wet-process phosphoric acid into an organic phase. In one type of process, the metal ions in a reduced state are extracted from wet-process acid into an organic phase containing esters of orthophosphoric acid as described in Hurst, et al., U.S. Pat. No. 3,835,214. In the alternative type of process the metal ions in an oxidized state are extracted into an organic phase containing a disubstituted ester of orthophosphoric acid together with a triorganophosphine oxide as described in Hurst, et al., U.S. Pat. No. 3,711,591 and Lucid, et al., U.S. Pat. No. 4,212,849. Examples of mixtures of phosphorus compounds which have been disclosed for extracting oxidized forms of the metal ions are di(2-ethylhexyl)phosphoric acid (DEPA) combined with trioctylphosphine oxide (TOPO), and dioctylphenyl phosphoric acid (DOPPA) combined with trioctylphosphine oxide. The methods of extracting oxidized froms of the metal ions from wet-process phosphoric acid into organic solutions of these mixtures of phosphorus compounds are hereinafter referred to as the DEPA-TOPO and DOPPA-TOPO processes, respectively. The present invention is an improvement in the DEPA-TOPO and DOPPA-TOPO processes for recovering vanadium from wet-process phosphoric acid.

In the DEPA-TOPO and DOPPA-TOPO processes, uranium (IV) and vanadium (IV) in the crude phosphoric acid solution are oxidized to uranium (VI) and vanadium (V) by an appropriate oxidizing agent or combination of oxidizing agents. Many oxidizing agents have been described in the art, e.g., sodium chlorate, air, pure oxygen, and hydrogen peroxide. Although sodium chlorate appears to have been extensively used, chlorides resulting from use of this oxidant are corrosive and also can carry over into the fertilizer as undesirable impurities. Air and pure oxygen have low solubility in wet-process phosphoric acid, and specialized equipment, capable of withstanding pressure, may be necessary for efficient use of these gaseous oxidants. Hydrogen peroxide is becoming increasingly desirable as an oxidant for vanadium because it is non-corrosive, contributes no impurities to the phosphate fertilizer product, and is easily mixed with the wet-process phosphoric acid solution in standard equipment.

In the art of the DEPA-TOPO and DOPPA-TOPO processes, the teaching is to first oxidize vanadium and uranium in wet-process phosphoric acid to vanadium (V) and uranium (VI). In a second, separate step, the oxidized solution is transferred to an extractor containing the organic phase. When hydrogen peroxide is used to oxidize the vanadium component of wet-process phosphoric acid, this aforesaid two-step process of oxidation and extraction leads to less than optimal recovery of vanadium and leads to inefficient use of hydrogen peroxide.

The present invention of combining the oxidation and extraction procedures into a single step will increase the recovery of vanadium, and can increase the efficiency of use of the hydrogen peroxide oxidant. Also, this combination of steps into a single step process allows for capital and operating cost savings.

SUMMARY OF THE INVENTION

According to the present invention, there is an improvement in the DEPA-TOPO annd DOPPA-TOPO processes whereby the two steps of oxidation and extraction of vanadium from wet-process phosphoric acid are combined. The oxidant is added during the extraction step.

DETAILED DESCRIPTION OF THE INVENTION

The detailed process conditions for the overall DEPA-TOPO and DOPPA-TOPO processes are well known to those skilled in the art. The DEPA-TOPO process is described in Hurst, et al., U.S. Pat. No. 3,711,591 and in a paper presented by Hurst at the AIME (American Institute of Mining Engineers) Annual Meeting, Las Vegas, Nev., Feb. 22–26, 1976, available as Preprint Number 76-B-66 of Society of Mining Engineers of AIME in Littleton, Colo., 80123. The DOPPA-TOPO process is described in Lucid, et al., U.S. Pat. No. 4,212,849. The DEPA-TOPO and DOPPA-TOPO processes as described in these patents and paper are hereby incorporated by reference.

Addition of aqueous hydrogen peroxide to solutions of vanadium (IV) in wet-process phosphoric acid results in oxidation of a portion of the vanadium (IV) to vanadium (V), the form which is best extracted by DEPA-TOPO or DOPPA-TOPO. The portion of vanadium not oxidized is inefficiently extracted into the organic phase with the result that vanadium values are only partly recovered from such solutions. The oxidation of vanadium (IV) with hydrogen peroxide in wet-process phosphoric acid solutions is accompanied by a secondary reaction in which hydrogen peroxide is partly decomposed to products which are not useful as oxidants for vanadium. This decomposition reaction results in a loss of peroxide value and less than optimal use of the hydrogen peroxide reagent.

According to the present invention both the efficiency of extraction of vanadium from wet-process phosphoric acid into the organic phase, and the efficiency of use of the oxidant, preferably hydrogen peroxide, are increased by modifying the DEPA-TOPO and DOPPA-TOPO processes so that the vanadium oxidation step and the extraction step are combined into a single operation.

The process begins by combining the wet-process phosphoric acid, containing a reduced from of vanadium, and optionally uranium, which may have been previously oxidized by another oxidant, with the organic DEPA-TOPO or DOPPA-TOPO phase. Once mixing has begun, a less than stoichiometric quantity of hydrogen peroxide is added and mixing is continued. As vanadium passes into the organic phase, additional hydrogen peroxide is supplied to the continuously mixed phases. Hydrogen peroxide addition is continued until the phosphoric acid is sufficiently depleted in vanadium. Hydrogen peroxide is added during the simultaneous oxidation and extraction process either continuously or in small successive portions.

Once the organic phase has been enriched in vanadium, the metal values in this phase are further refined, for instance as described again in the aforementioned U.S. Pat. Nos. 3,711,591 and 4,212,849.

Combining the vanadium oxidation and extraction steps, thereby providing simultaneous oxidation and extraction, allows vanadium to be continuously transferred from the wet-process phosphoric acid phase into the DEPA-TOPO or DOPPA-TOPO phase. This technique overcomes the problem of incomplete vanadium oxidation which occurs when the wet-process phosphoric acid stream is treated with hydrogen peroxide in an isolated process stage.

Combining the oxidation and extraction steps allows hydrogen peroxide to be supplied at an optimized rate. Losses from the hydrogen peroxide decomposition reaction are thereby reduced.

The minimum amount of hydrogen peroxide required for oxidation of vanadium can be determined from analysis of the valence state and the quantity of vanadium. The actual hydrogen peroxide requirement will be in excess of the stoichiometric amount, and will depend on conditions which may vary with each wet-phosphoric acid process stream, and with each process design. Temperature is one of the conditions which may vary. The operable temperature range, and the temperature effect on extraction efficiency, are discussed in the aforementioned U.S. Pat. No. 3,711,591. Organics or other metals may be present which will consume hydrogen peroxide non-productively, either by their reducing action or their ability to catalyze peroxide decomposition reactions. Mixing and extraction efficiency are variables which affect the consumption of hydrogen peroxide. As extraction efficiency is improved, losses from vanadium-catalyzed peroxide decomposition reactions are reduced. The rate of feed of hydrogen peroxide is a variable which is adjusted so that excessive amounts of oxidized species do not build up in the wet-process phosphoric acid solution.

The hydrogen peroxide used can be any of the commercial grades available on the market. Commercial grades of hydrogen peroxide contain various types of stabilizers depending upon the end-use to which a particular grade is destined. For the present invention, none of the stabilizers in the commercial grades of hydrogen peroxide appear to have an adverse effect on the oxidation of vanadium (IV) to vanadium (V).

The concentration of hydrogen peroxide solution used is not critical and appears to be more a function of convenience. When used on a commercial scale to treat large volumes of phosphoric acid solution, hydrogen peroxide is conveniently used at commercial concentrations, i.e., a stength of about 30–55 percent by weight, without dilution.

The extraction solvent composition can be a reagent, generally dissolved in a hydrocarbon diluent such as kerosene. Extractant solvents are standard and well known in the art.

I claim:

1. In a extraction process for recovering vanadium values from wet-process phosphoric acid solution wherein vanadium in the solution is oxidized to vanadium (V) and thereafter extracted from the solution by contact with a DEPA-TOPO or DOPPA-TOPO water immiscible organic phase, the improvement which comprises combining the vanadium oxidation and extraction steps by adding sufficient oxidant to the phosphoric acid solution to convert vanadium to the vanadium (V) oxidation state and simultaneously extracting the vanadium values.

2. The process of claim 1 wherein the oxidant is hydrogen peroxide.

* * * * *